Sept. 6, 1966 M. R. FORT 3,270,698
FLOATING DRY DOCK

Filed Feb. 25, 1965 2 Sheets-Sheet 1

INVENTOR.
MARCEL R. FORT
BY Earnest Carl Edge

Sept. 6, 1966　　　　　　　　　M. R. FORT　　　　　　　3,270,698
　　　　　　　　　　　　　FLOATING DRY DOCK

Filed Feb. 25, 1965　　　　　　　　　　　　　　　　2 Sheets-Sheet 2

INVENTOR.
MARIEL R. FORT
BY Ernest Carl Edge

United States Patent Office 3,270,698
Patented Sept. 6, 1966

3,270,698
FLOATING DRY DOCK
Marcel R. Fort, Plantation, Fla.
(1600 NE. 126th St., North Miami, Fla.)
Filed Feb. 25, 1965, Ser. No. 435,251
7 Claims. (Cl. 114—45)

This invention relates in general to a dry dock and in more particularity to the type of dry dock known in the art as a floating dry dock.

Such devices in common use today are usually of the type with two rigidly connected compartmented pontoons into which water is introduced to cause the dock to sink below the surface of the water. After the dry dock is submerged, a boat is placed in location above the dock, between the pontoons, the water is removed from the pontoons and the buoyancy of the device will cause it to rise upwardly, lifting the boat with it until the boat is raised above the surface of the water. This type of dry dock is very utilitarian in relatively deep water where there is enough space for the two pontoons to travel downwardly and upwardly without contacting the bottom surface of the body of water.

However, oftentimes it is desired to use a floating dry dock near a sea wall, a stream bank, or such, where the bottom ground surface is not even but takes the configuration of an inclined surface with the water near the one side being relatively shallow and getting progressively deeper as you move away from the shore. In such a situation, if a regular commonly known type of floating dry dock is sunk for the accommodation of a boat, the dock will rest on the bottom surface in a tilted position so that it is impossible to get the boat over the middle portion of the dry dock to be raised thereby.

It is the primary object of my invention, therefore, to provide a floating dry dock in which the pontoons are not rigidly connected but hinged together in such a manner that one of the pontoons may be moved up and down relative to the other without the two pontoons having to follow parallel paths of travel upwardly and downwardly simultaneously.

It is a further object of the invention to provide a floating dry dock in which one pontoon acts as a hub and the second pontoon pivots in an arcuate path relative to said first pontoon.

It is a further object of the invention to provide a floating dry dock in which only one of the pontoons is filled and emptied to effect movement of a boat out of the water, and the second pontoon remains afloat at all times, providing a level docking and working surface.

It is a still further object of the invention to provide a floating dry dock which is relatively lightweight and therefore easy to manipulate, inexpensive to produce and assemble, which will withstand prolonged and constant tough handling, and still possess great strength and stability.

Other objects, advantages, and capabilities will be more apparent from the following description, taken in conjunction with the accompanying drawing, wherein.

Figure 1:
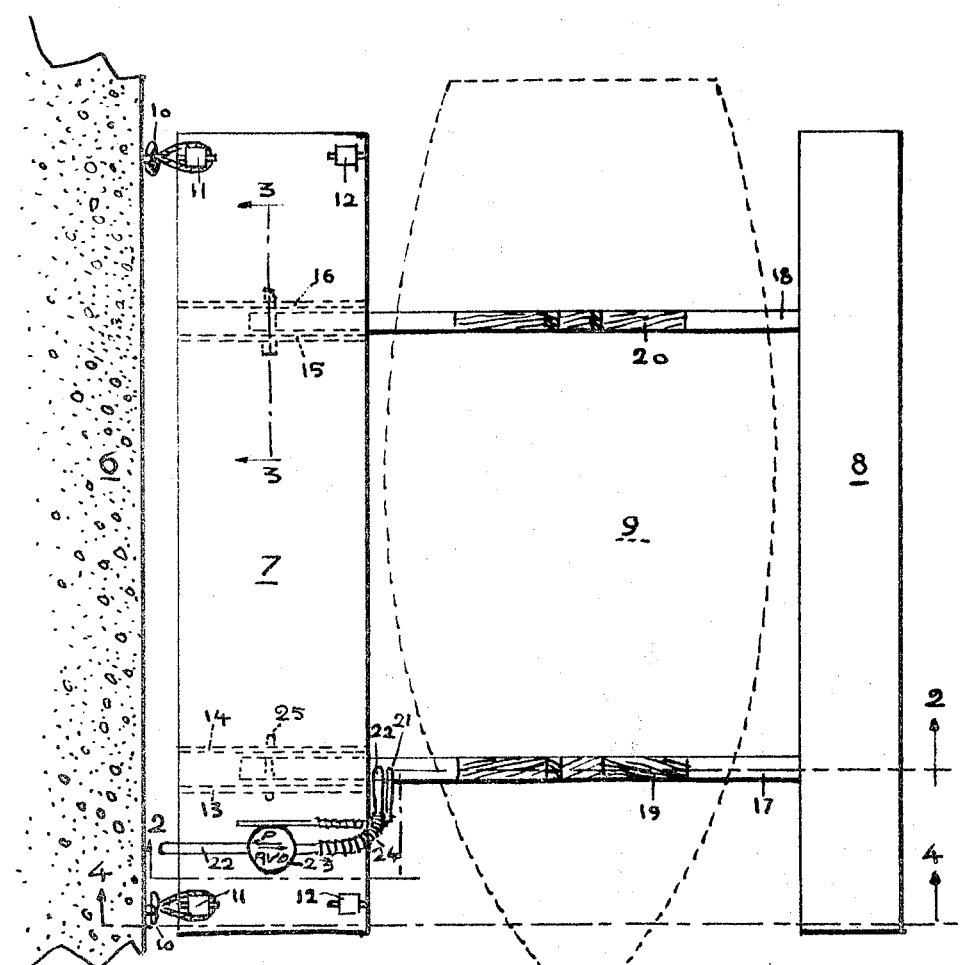
FIGURE 1 is a top plan view of a dry dock according to my invention.

Referring now to FIGURE 1 of the drawing, the invention is illustrated in use with a sea wall 6 of common construction to which pontoon 7 is secured in the usual manner by means of rings 10 on the seawall and cleats 11 on the pontoon 7. Pontoon 7 is also provided with a plurality of cleats 12 to which the boat 9, illustrated in dotted line, is attached.

Pontoon 7 is a hollow member, preferably sealed so that water cannot enter into it, and is intended to float on the water in an upright, substantially level position at all times. This provides a convenient surface for walking, for working, for boarding the boat, for docking the boat, etc. Even during the lowering and raising of the dry dock this pontoon 7 remains in position, as will be described subsequently in this specification.

Near one end of pontoon 7, on the underside thereof, it is provided with two parallel plates 13 and 14 extending perpendicularly thereto. Nearer the other end of the pontoon are two plates 15 and 16. The purpose of these plates is to provide a hinge for the connecting members 17 and 18 which connect pontoons 7 and 8.

Figure 4:
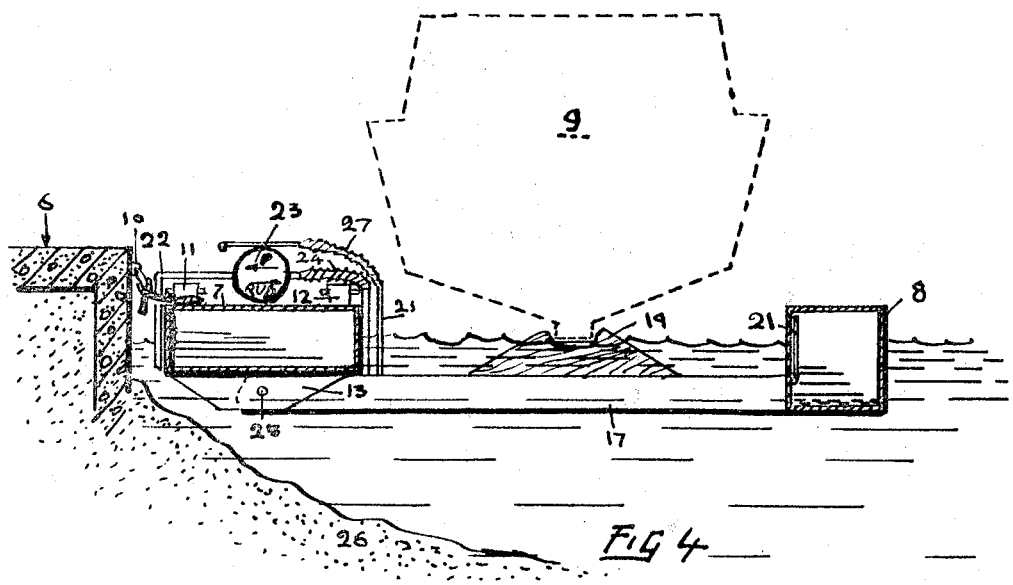
FIGURE 4 is a cross-sectional view of the dock taken substantially on the lines 4—4 of FIGURE 1.

Connecting members 17 and 18 also provide support for the boat 9 when it is in its raised position as shown in FIGURE 4. Carried by member 17 is member 19 cut to fit the particular contour of the bottom of the boat being serviced. A member 20, symmetrical to member 19, is carried by connector 18.

Figure 2:
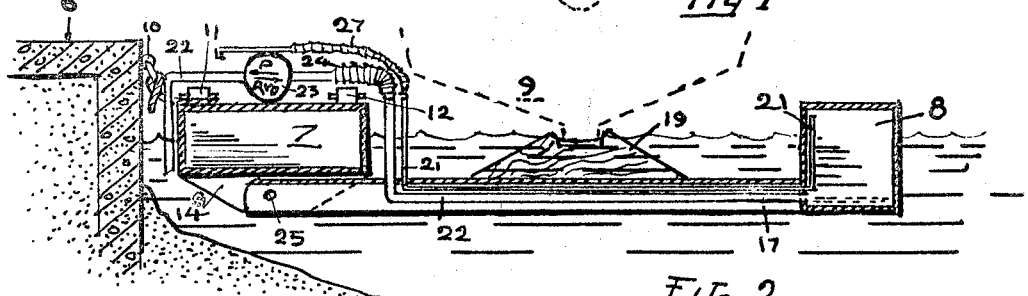
FIGURE 2 is a cross-sectional view taken substantially on the lines 2—2 of FIGURE 1.
Figure 3:
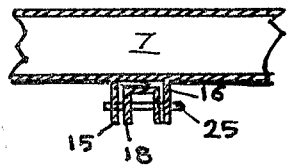
FIGURE 3 is a cross-sectional view of one of the hinges taken substantially on the lines 3—3 of FIGURE 1.

Each of members 17 and 18 are substantially U-shaped in cross section with the open portion of the U extending downwardly as shown in detail in FIGURES 2 and 3. The inside of each of these members provides a convenient location to store air line 21 and water line 22. Although the lines 21 and 22 are shown here as being located in member 17 they could just as well be located in member 18.

Water line 22 is connected at one end to pump 23 by means of a flexible portion 24 and extends through member 17 into the inside of hollow pontoon 8. The end of line 22 is located near the bottom surface of pontoon 8 so that most of the water may be extracted therefrom.

Air line 21 is open to the atmosphere at one end and has a flexible portion 27 which extends through member 17 and into pontoon 8. The air line extends upwardly to a location near the top of the pontoon 8 so as to provide air to the pontoon as water is pumped therefrom. For convenience sake, and to keep the end of line 21 away from the water, it is shown here as attached to but not connected to pump 23. If desired it could be connected so that air is pumped in as the water is being pumped out of pontoon 8.

FIGURE 3 shows the pivotal connection of connecting member 18 to pontoon 7. Member 18 extends between and parallel to members 15 and 16 and pin 25 extends through each of these members.

Operation of the dry dock according to my invention is as follows: with both of pontoons 7 and 8 in the raised or floating position, with no boat resting thereon, pump 23 is activated to pump water through line 22 into the inside of pontoon 8. As the water enters the pontoon the air therein is forced out through line 21 and discharged to the atmosphere.

The water entering pontoon 8 will cause it to slowly sink below the surface of the water and in so doing arms 17 and 18 will pivot about pins 25 which hold them in pivotal relationship with the respective plates 13, 14, 15, and 16.

Figure 5:
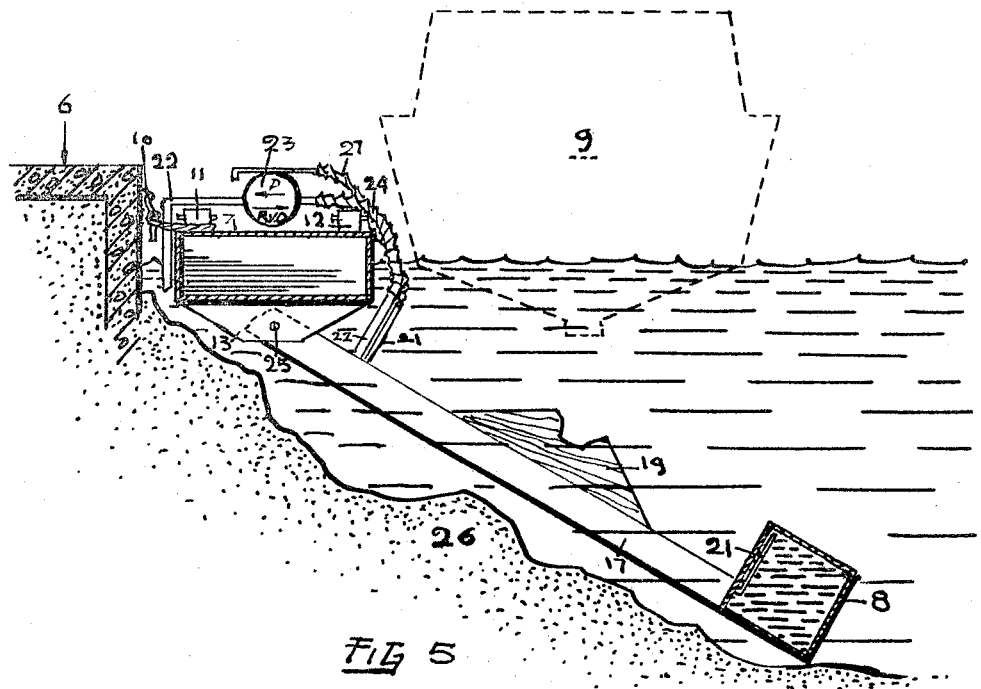
FIGURE 5 is a view similar to that in FIGURE 4 with the dock in its lowered boat-receiving position.

As best illustrated in FIGURE 5, if the bottom of the body of water is sloping, as is common alongside seawalls, docks, etc., the member 17 will pivot until it is substantially parallel with the bottom surface. Further, if the two pontoons were rigidly, rather than hingedly, connected, as pontoon 8 submerges the pontoon 7 would tilt thereby destroying its effectiveness as a docking member.

Once pontoon 8 is in its lowermost position, a boat is docked alongside pontoon 7 and secured to the cleats 12. Pump 23 is then reversed and the water inside pontoon 8 is pumped out. As it is removed, air enters through line 21 to fill the pontoon and cause it to rise toward the surface.

In rising, supports 19 and 20 contact the bottom of the boat 9 and lift it upwardly to the position shown in FIGURE 4.

Once the work on boat 9 has been completed, pontoon 8 is refilled with water to lower it to the position of FIGURE 5, and the boat is again in the water.

Although only one embodiment of my invention has been shown and described, it is understood that it is not intended to be exhaustive nor limiting of the invention, but on the contrary, is given for purposes of illustration in order that others skilled in the art may fully understand the invention and the principles thereof, and the manner of applying it in practical use so that they may modify and adapt it in various forms, each as may be best suited to the conditions of a particular use, and still be within the scope of my invention.

What is claimed is:
1. A floating dry dock comprising
 (a) a first pontoon,
 (b) said pontoon carrying securing means for connecting said dry dock to a dock,
 (c) said pontoon also providing docking means for a boat,
 (d) a second pontoon spaced from said first pontoon by a plurality of arms,
 (e) said arms hingedly connected to the first pontoon,
 (f) said arms rigidly connected to said second pontoon, and
 (g) means for filling and emptying said second pontoon.

2. A floating dry dock comprising
 (a) a first pontoon,
 (b) said pontoon carrying securing means for connecting said dry dock to a dock,
 (c) said pontoon also providing means for securing a boat thereto,
 (d) a second pontoon spaced from said first pontoon by a plurality of arms,
 (e) said arms hingedly connected to the first pontoon,
 (f) said arms rigidly connected to said second pontoon,
 (g) each of said arms carrying boat supporting means, and
 (h) means carried by said arms for filling and emptying said second pontoon.

3. A floating dry dock comprising
 (a) a first pontoon,
 (b) said pontoon carrying securing means for connecting said dry dock to a dock,
 (c) said pontoon also providing means for securing a boat thereto,
 (d) a second pontoon spaced from said first pontoon by a plurality of arms,
 (e) said arms hingedly connected to the first pontoon,
 (f) said arms rigidly connected to said second pontoon,
 (g) each of said arms carrying boat supporting means, and
 (h) a pump for emptying and filling said second pontoon.

4. A floating dry dock according to claim 3 with
 (i) conduit means carried by at least one of said arms for connecting the pump to the inside of said second pontoon.

5. A floating dry dock comprising
 (a) a first pontoon,
 (b) said pontoon carrying securing means for connecting said dry dock to a dock,
 (c) said pontoon also providing means for securing a boat thereto,
 (d) a second pontoon spaced from said first pontoon by a plurality of arms,
 (e) said arms hingedly connected to the first pontoon,
 (f) said arms rigidly connected to said second pontoon,
 (g) each of said arms carrying boat supporting means,
 (h) a pump carried by said first pontoon, and
 (i) conduit means extending from said pump through one of said arms to the interior of the second pontoon.

6. A floating dry dock according to claim 5 with
 (j) an air line extending from the interior of said second pontoon to the atmosphere.

7. A floating dry dock according to claim 5 with
 (j) an air line extending from the interior of said second pontoon and through one of said arms to a location on said first pontoon.

References Cited by the Examiner
UNITED STATES PATENTS

| | | | |
|---|---|---|---|
| 2,732,818 | 1/1956 | Quirn | 114—46 |
| 2,774,322 | 12/1956 | Harris | 114—46 |

FOREIGN PATENTS

| | | |
|---|---|---|
| 98,810 | 1898 | Germany. |
| 470,255 | 1/1929 | Germany. |

MILTON BUCHLER, *Primary Examiner.*
A. H. FARRELL, *Assistant Examiner.*